(12) United States Patent
Borisov et al.

(10) Patent No.: US 12,619,485 B1
(45) Date of Patent: May 5, 2026

(54) INITIATING STORAGE VOLUME HEALTH TESTS VIA CONTAINER ORCHESTRATION SYSTEMS

(71) Applicant: Dell Products, L.P., Round Rock, TX (US)

(72) Inventors: Mikhail Borisov, Dublin (IE); Danil Safronov, Warsaw (PL); Mikhail Edkov, Ballincollig (IE)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/937,691

(22) Filed: Nov. 5, 2024

(51) Int. Cl.
　　*G06F 11/00* (2006.01)
　　*G06F 11/07* (2006.01)

(52) U.S. Cl.
　　CPC .......... *G06F 11/006* (2013.01); *G06F 11/008* (2013.01); *G06F 11/0727* (2013.01); *G06F 11/0751* (2013.01)

(58) Field of Classification Search
　　CPC .. G06F 11/006; G06F 11/008; G06F 11/0727; G06F 11/0751; G06F 11/0766; G06F 11/0755; G06F 11/2273; G06F 11/3688; G06F 3/0614–0617
　　See application file for complete search history.

(56) References Cited

U.S. PATENT DOCUMENTS

| | | | | |
|---|---|---|---|---|
| 9,043,658 B1 * | 5/2015 | Marr | ........................ | G06F 12/14 |
| | | | | 702/182 |
| 9,886,338 B1 * | 2/2018 | Khokhar | ................. | G06F 11/34 |
| 2007/0043974 A1 * | 2/2007 | LeBlanc | ............. | G06F 11/2268 |
| | | | | 714/E11.147 |
| 2020/0136943 A1 * | 4/2020 | Banyai | ................ | H04L 41/5019 |
| 2023/0251779 A1 * | 8/2023 | Schuh | ................. | G06F 11/3037 |
| 2024/0385845 A1 * | 11/2024 | Peterson | ............... | G06F 9/5072 |

OTHER PUBLICATIONS

"pv_handler.go", Aug. 1, 2020, <https://github.com/kubernetes-csi/external-health-monitor/blob/e84ee08afe4f5d94dc805957f448946ec663860e/pkg/csi-handler/pv_handler.go> (Year: 2020).*
"Kubernetes-csi / external-health-monitor", Nov. 1, 2023, <https://github.com/kubernetes-csi/external-health-monitor/tree/e84ee08afe4f5d94dc805957f448946ec663860e> (Year: 2023).*
Cavanagh, Luke, "Guide to the smartctl utility in smartmontools for Linux", Dec. 20, 2023, <https://web.archive.org/web/20240910112856/https://www.liquidweb.com/blog/smartctl-utility-in-smartmontools-for-linux/> (Year: 2023).*

* cited by examiner

*Primary Examiner* — Marc Duncan
*Assistant Examiner* — Albert Li
(74) *Attorney, Agent, or Firm* — Amin, Turocy & Watson, LLP

(57) ABSTRACT

Architectures and techniques are described that can leverage a container storage interface (CSI) driver to initiate volume health tests for a storage system in accordance with certain embodiments of this disclosure. The CSI driver can conform to a CSI specification or standard and can be used to expose the storage system to a container orchestration system. The volume health tests can be tailored to reduce or mitigate the impact of testing based on a status or state of the volumes. For instance, enforcement can be provided to ensure that only shorter, low-impact testing is performed on volumes having a published state, whereas longer, more intensive testing can be performed on volumes that are not in the published state.

20 Claims, 11 Drawing Sheets

500A

500B

INITIATING STORAGE VOLUME HEALTH TESTS VIA CONTAINER ORCHESTRATION SYSTEMS

BACKGROUND

Containerization is a lightweight virtualization technique that provides high consistency, operating systems distribution portability, efficient resource management, and consistency across multiple environments. Thus, applications or application programming interfaces (APIs) can be containerized to provide numerous benefits to service providers and their subscribers. Due to the many benefits of containerization, many container orchestration (CO) systems and associated products have entered the marketplace to help automate and orchestrate containerization. One such example product is Kubernetes. Kubernetes is an open-sourced software tool that can effectively manage containerized applications with reduced manual intervention.

Container Storage Interface (CSI) is a standard for exposing arbitrary block and file storage systems to containerized workloads on CO systems like Kubernetes or others. CSI enables storage vendors to develop a plugin once and have the plugin work across multiple CO systems, without requiring modifications to the core CO code.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
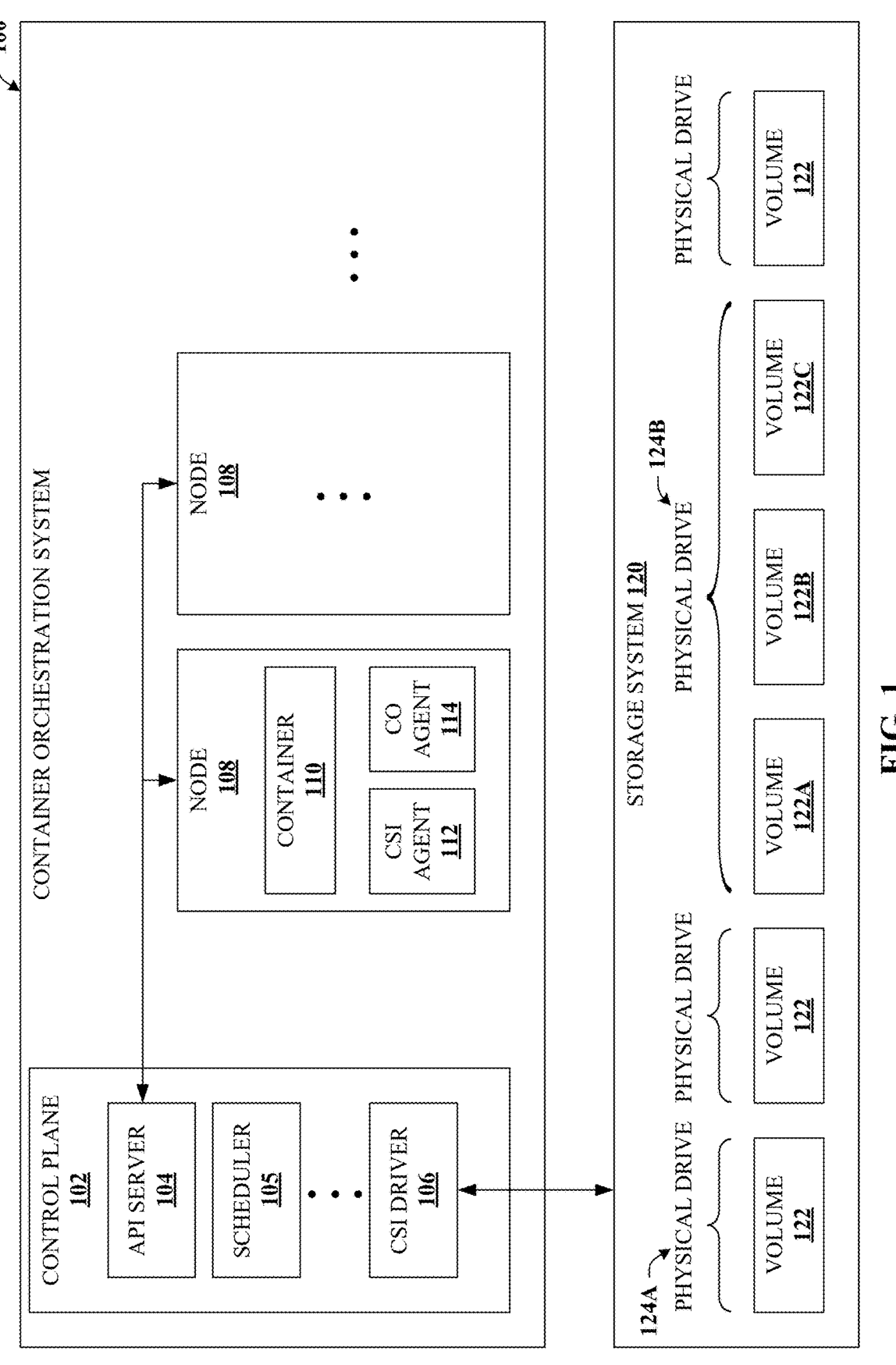
FIG. 1 shows a schematic block diagram illustrating an example container orchestration (CO) system using a container storage interface driver to interface to a storage system in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

To provide additional context, consider FIG. 1. FIG. 1 shows a schematic block diagram illustrating an example container orchestration (CO) system using a container storage interface driver to interface to a storage system in accordance with certain embodiments of this disclosure. For example, CO system 100 can represent a container orchestration platform cluster or the like. As a representative example used for the remainder of this document, CO system 100 is presented in the context (e.g., operation and nomenclature) of a Kubernetes system, which is, today, the most widely used enterprise container orchestration system or platform. However, it is appreciated that the disclosed techniques can be applied to any suitable container orchestration platform, which may have different functional approaches or use different nomenclature to refer to similar functional elements. That is, the disclosed techniques can be suitably applied to any container orchestration platform or another platform that implements the functional element detailed herein.

As illustrated, CO system 100 can comprise control plane 102 and one or more nodes 108. In some embodiments, control plane 102 can be a master node and nodes 108 can represent worker nodes. Control plane 102 can operate to manage and coordinates the lifecycle of containers (e.g., container 110) across a cluster of nodes 108. Control plane 102 can act as a centralized authority, enforcing policies, and ensuring consistency and reliability across the distributed environment.

Control plane 102 can comprise application programming interface (API) server 104 and many other elements including a scheduler 105 or the like. Moreover, particular to the disclosed subject matter, control plane 102 can comprise container storage interface (CSI) driver 106. API server 104 can serve as the primary interface for interacting with control plane 102 and submitting requests to manage the cluster. API server 104 can expose a RESTful API, enabling clients to communicate with the control plane and perform various operations. Scheduler 105 can be responsible for efficiently allocating and managing container resources across a cluster of nodes, including, e.g., workload scheduling, node 108 selection, container 110 placement, resource allocation, and event handling.

CSI driver 106 can represent a software component, conforming to a CSI specification, that enable the CO system 100 (e.g., Kubernetes) to interact with various storage systems such as storage system 120, which can be vendor-specific in terms of architecture and operation. As illustrated here, storage system 120 can comprise one or more volumes 122 that can be interacted with via CO system 100. One or more volume 122 can be included on a single physical drive 124 or storage device such as a hard disk drive (HDD), a solid state drive (SSD), or other drive types. For instance, in the illustrated example, physical drive 124A comprises a single volume 122, whereas physical drive 124B comprises multiple volumes 122A, 122B, and 122C.

Regardless, CSI driver 106 can act as a bridge between container orchestration platforms (e.g., CO system 100) and the underlying storage infrastructure (e.g., storage system 120), allowing CO system 100 to provision, attach, and manage storage volumes 122. CSI drivers 106 can be responsible for implementing the CSI specification, which defines a set of APIs and protocols for storage systems to communicate with container orchestration platforms like Kubernetes.

Furthermore, CO system 100 can comprise CSI agents (e.g., CSI agent 112) and CO agents (e.g., CO agent 114), which can also be referred to as sidecar containers. Typically, CSI agents 112 are a type of container that runs alongside CSI driver 106. A primary responsibility of CSI agent 112 can be to watch for CO system 100 events, such as volume attachment or detachment events, and trigger the corresponding actions on storage system 120 using CSI driver 106. CSI agents can come in two types, namely a controller agent (not shown) that runs on control plane 102 and watches for event objects, and a node agent (e.g., CSI agent 112) that runs on nodes 108 looking for associated event objects. Apart from storage-specific operations, CO agent 114 can operate to automate the deployment, management, and scaling of containerized applications.

Because storage systems are generally vendor-specific, CSI drivers 106 are typically developed by storage vendors or third-party developers to support specific storage systems 120, such as block storage, file systems, or object storage. CSI drivers 106 can be containerized and deployed as part of the CO system 100 (e.g., Kubernetes) cluster, allowing CO system 106 to discover and register the available storage systems.

Hence, using CSI driver 106, third-party storage providers (e.g., vendors) can write and deploy plugins exposing new storage systems in Kubernetes (or other CO system 100) without ever having to touch the core Kubernetes code. For example, CSI drivers 106 can expose a rich set functionality to manage volumes, such as:

Dynamic provisioning and deprovisioning of a volume 122

Attaching or detaching a volume 122 from a node 108.

Mounting/unmounting a volume 122 from a node 108.

Figure 2:
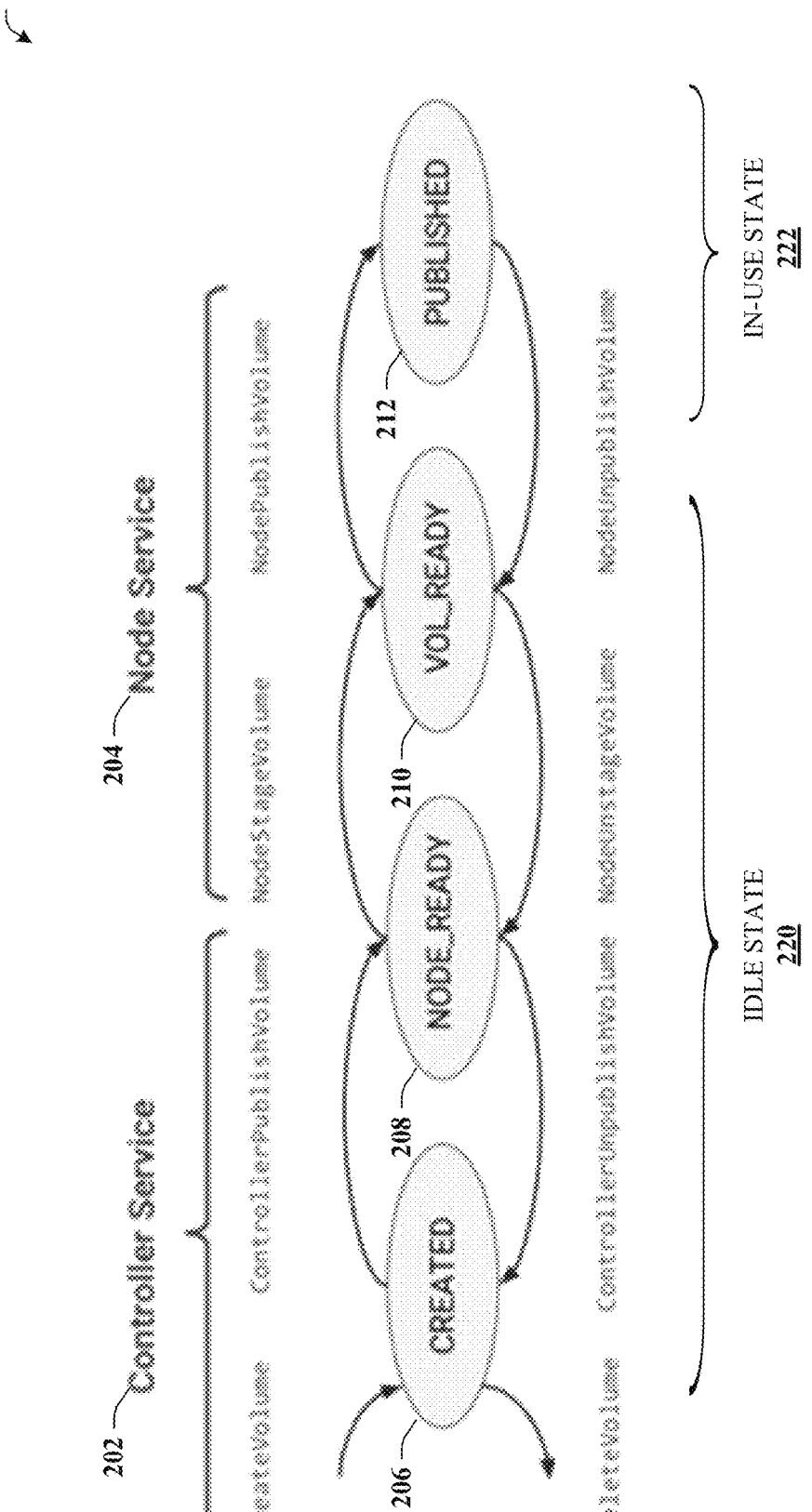
FIG. 2 depicts schematic diagram illustrating CSI volume lifecycle APIs in accordance with certain embodiments of this disclosure.

While still referencing FIG. 1, but turning now as well to FIG. 2, schematic diagram 200 is depicted illustrating CSI volume lifecycle APIs in accordance with certain embodiments of this disclosure. For example, existing CSI drivers 106 can comprise lifecycle APIs that can be accessed via controller services 202 and node services 204.

For example, a CreateVolume API can be used to provision a new volume 122 in the underlying storage system 120, which is typically requested by a CO system 100 controller via controller service 202. CSI driver 106 can return a unique volume ID to identify the new volume and the state of the new volume 122 can be indicated to be in a created state 206.

Likewise, a ControllerPublishVolume API can be used to make the volume 122 available to a node 108 in a CO system 100 cluster, and the volume 122 can be considered to be in a node_ready state 208. A NodeStageVolume API can be used to initiate a staging process (e.g., formatting, mounting, initializing, . . . ) for volume 122 on a specific node 108 to prepare the volume for use by a pod, which can be considered to be in a vol_ready state 210. A NodePublishVolume API can be used to make a provisioned volume 122 available to a pod of node 108, which can be identified as being in a published state 212.

In accordance with the disclosed subject matter, identification of the state (e.g., 206, 208, 210, 212, . . . ) can be used in connection with volume 122 health testing techniques. For example, as will be further detailed herein, volumes 122 in a created state 206, a node_ready state 208, or a vol_ready state 210 can be considered to be in idle state 220 for the purposes of health testing. Volumes 122 in a published state 212 can be considered to be in an in-use state 222 for the purposes of health testing.

Still referring to FIG. 1, it can be observed that for storage service providers or other scenarios, CSI drivers 106 from different vendors can be used to manage stateful components like, e.g., a Storage Server IO Engine.

However, when managing a storage system, it can be critical to be able to detect unhealthy volumes 122 and initiate recovery processes, for instance, to prevent data loss. Currently, storage systems 120 can check for input/output (IO) errors as a mechanism for determining an unhealthy volume 122, but such is not especially reliable. A more reliable way is to obtain volume health from CSI driver 106.

Unfortunately, volume health detection is specific to a storage vendor, but in general in order to have up-to-date health status, at least some background tests must be run to check underlying storage volumes 122. By default, CSI driver 106 will count only those errors which occurred on specific data access (e.g., read/write of the indicated portions) which is not accurate and cannot guarantee detection of many "disk unhealthy" conditions.

Furthermore, any such tests that are sufficient to identify unhealthy disk conditions might have a significant impact on IO performance and thus, must be scheduled by a user. Again, without running such tests CSI driver 106 will count only those errors which occurred on specific data accesses (e.g., read/write of certain areas), which is not accurate and cannot guarantee detection of "disk unhealthy" conditions.

At present, there is no way to manage execution of volume health tests in Kubernetes or other container orchestration platforms using Container Storage Interface and no implementation available in existing CSI drivers 106. Hence, the disclosed subject matter are directed in some embodiments to providing techniques that can be implemented in Kubernetes or other CO systems 100 to allow the execution of volume health tests. As one example, a CSI driver 106 as well as APIs exposed by API server 104 can be extended for these and other purposes, e.g., in a manner that can certain existing allow volume heath test management elements to be able to detect volume unhealthy conditions proactively.

Existing volume health monitoring techniques do not allow for the initiation of health tests and can thus only identify a small fraction of the data typically needed to guarantee detection (either reactively or proactively) to the degree used by recovery point objective (RPO) and recovery time objectives (RTO). The disclosed techniques can be used to identify volume unhealthy conditions sufficiently to guarantee storage system RPO and RTO goals. Moreover, as will be explained in more detail below, such can be attained with reduced or minimal impact on the performance of the storage system.

Example Systems

Figure 3:
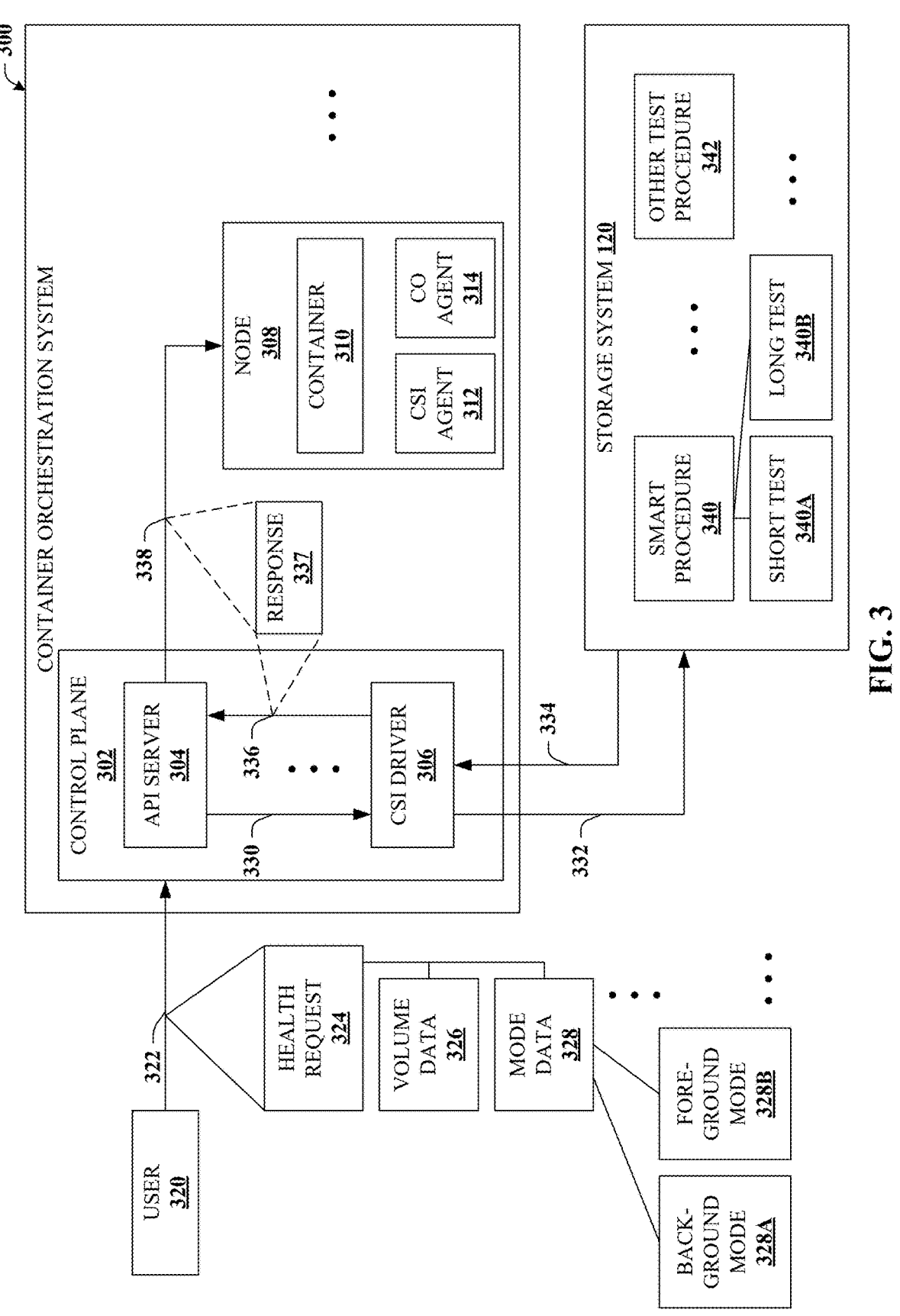
FIG. 3 depicts a schematic block diagram illustrating an example CO system that can leverage a CSI driver to initiate volume health tests for a storage system in accordance with certain embodiments of this disclosure.

With reference now to FIG. 3, a schematic block diagram is depicted illustrating an example CO system 300 that can leverage a CSI driver 306 to initiate volume health tests for a storage system 120 in accordance with certain embodiments of this disclosure. CO system 300 can be similar to previous CO system 100, but can be extended to allow the disclosed techniques in ways that will become apparent in this disclosure.

For example, control plane 302 can comprise API server 304 and other components (e.g., a scheduler) as well as a CSI driver 306, which can be similar to like-identified elements 102, 104, and 106 of FIG. 1. CO system 300 can also include node 308 (e.g., node 108), container 310 (e.g., container 110), CSI agent 312 (e.g., CSI agent 112), and CO agent 314 (e.g., CO agent 114). In some embodiments, one difference between control plane 302 and control plane 102 can relate specifically to adding API or remote procedure call (RPC) elements to handle volume health test calls and the like.

In that regard, API server 304 and CSI driver 306 can represent expanded versions of API server 104 and CSI driver 106, respectively. Furthermore, in some embodiments, a new CO system 300 resource (referred to herein as VolumeHealthTestSuite) can be implemented in the existing CSI specification namespace with information such as scheduler options (e.g., added by a user) and test suite stats (e.g., added by health monitoring controller). An example of this addition to the CSI specification in the context of Kubernetes is provided below:

```
1. apiVersion: storage.k8s.io
2. kind: csivolumehealthtestsuite
3. spec:
4. scheduler:
5. volumes:
6. - name: {string}
7. . . .
8. maxparallelvolumes: {uint}
9. testoptions: {map}
10. testsinterval: {duration}
11. droptimeout: {duration}
12. status:
13. volumes:
14. - name: {string}
15. status: {IN_PROGRESS, FAILED, COMPLETED, ABORTED}
16. progress: uint
17. time: {duration}
```

Regardless of the technique used, control plane 302 of CO system 300 can be configured to receive a health request 324 from user 320, which is illustrated at reference numeral 322. Hence, user 320 can activate or trigger health test events or the like. Health request 324 can request a health test of storage system 120. As previously noted, storage system 120 can be exposed to CO system 300 via CSI driver 306 that conforms to a specified CSI standard.

Health request 324 can comprise volume data 326, mode data 328, and potentially other information that is further detailed herein. Volume data 326 can identify a portion of storage system 120 to be tested as well as other information, examples of which can be found in connection with FIG. 5A. Mode data 328 can identify an operating mode of the requested health test.

By way of example, in some embodiments, mode data 328 can indicate background mode 328A, foreground mode 328B, or another suitable operating mode. For example, background mode 328A can indicate that the health test is to operate as a background operation having a limited impact on resource utilization of storage system 120 relative to an unrestricted impact on the resource utilization of storage system 120. Foreground mode 328A can indicate that the health test is to operate as a foreground operation with the unrestricted impact on the resource utilization of storage system 120.

In response to receiving health request 324, control plane 302 and/or API server 304 can, as illustrated at reference numeral 330 use CSI driver 306 to execute the health test. In that regard, as indicated at reference numeral 332, CSI driver 306 can forward the health test to storage system 120, where the health test can be invoked on the backend hardware. As a representative though non-limiting example, the health test can relate to a self-monitoring, analysis, and reporting technology (SMART) procedure 340. In other words, while SMART procedure 340 is used herein as a representative example, other health test procedures 342 might be used instead or in addition to SMART procedure 340.

SMART procedure 340 can relate to monitoring systems built into many modern storage devices such as HDDs or SSDs utilized to asses a health of the storage device and to predict potential failures. SMART procedure 340 typically provides a comprehensive evaluation of internal components of a storage device (e.g., drive 124) that is capable of detecting issues before those issues cause data loss or system crashes. The results of SMART procedure 340 can include indicators relating to exceeded threshold warnings (e.g., temperature, error rates, . . . ), predictive failure notification (e.g., impending mechanical failure), and detailed logs of errors and events.

In some embodiments, SMART procedure 340 can be initiated as a SMART short test 340A or a SMART long test 340B. Short test 340A provides for rapid identification of a defective storage device, relying on quick tests with minimal impact on the IO performance of storage system 120. Commonly, short test 340A can be completed in less than one or two minutes by checking the electrical and mechanical read/write state of the drive and scanning a limited portion (e.g., vendor-specific and/or time-limited) of the drive's storage elements. Short tests 340A does not scan all sectors for read errors, but can provide a basic report on the drive's health in a short amount of time with limited impact on resource utilization of storage system 120.

In contrast, long test 340B can scan the entire disk surface or other storage elements with no time limit. Hence, all sectors can be thoroughly checked for read errors and a detailed report can be generated of all potential errors for the drive. Results of long test 340B can be used to identify and potentially help fix certain issues proactively. However, long test 340B can run for an order of magnitude longer than short test 340A and can have a significant impact on resource utilization of storage system 120.

Hence, in accordance with some embodiments of the disclosed subject matter, the type of SMART procedure 340 to be utilized can be intelligently determined or enforced. For example, the type of SMART procedure 340 to be utilized for a given volume 122 can be selected or based on a state of that particular volume. For instance, if a target volume 122 is in an in-use state 222 (e.g., published state 212) then target volume 122 is likely to be subject to significant IO requests that may be dramatically impacted by health test procedures. As a result, the target volume 122 in the in-use state 222 can be limited only to short test 340A.

On the other hand, if the target volume 122 is in idle state 220 (e.g., in created state 206, node_ready state 208, or vol_ready state 210), then the target volume is not likely to be subject to significant IO. In this case, long test 340B can be favored. An indication of the selection between long test 340B and short test 340A can be provided by mode data 328 of health request 324. For example, if background mode 328A is indicated, such can be indicative of a request to perform short test 340A so that SMART procedure 340 can run in the background even though the target volume 122 is in the in-use state 222. Alternatively, if foreground mode 328B is indicated, such can be indicative of a request to perform long test 340B. Provided target volume 122 is in idle state 220, it is unlikely that SMART procedure 340 will interrupt other high priority IO and therefore can be run without restriction. An example flow associated with the disclosed techniques is provided with reference to FIG. 5.

Figure 4:
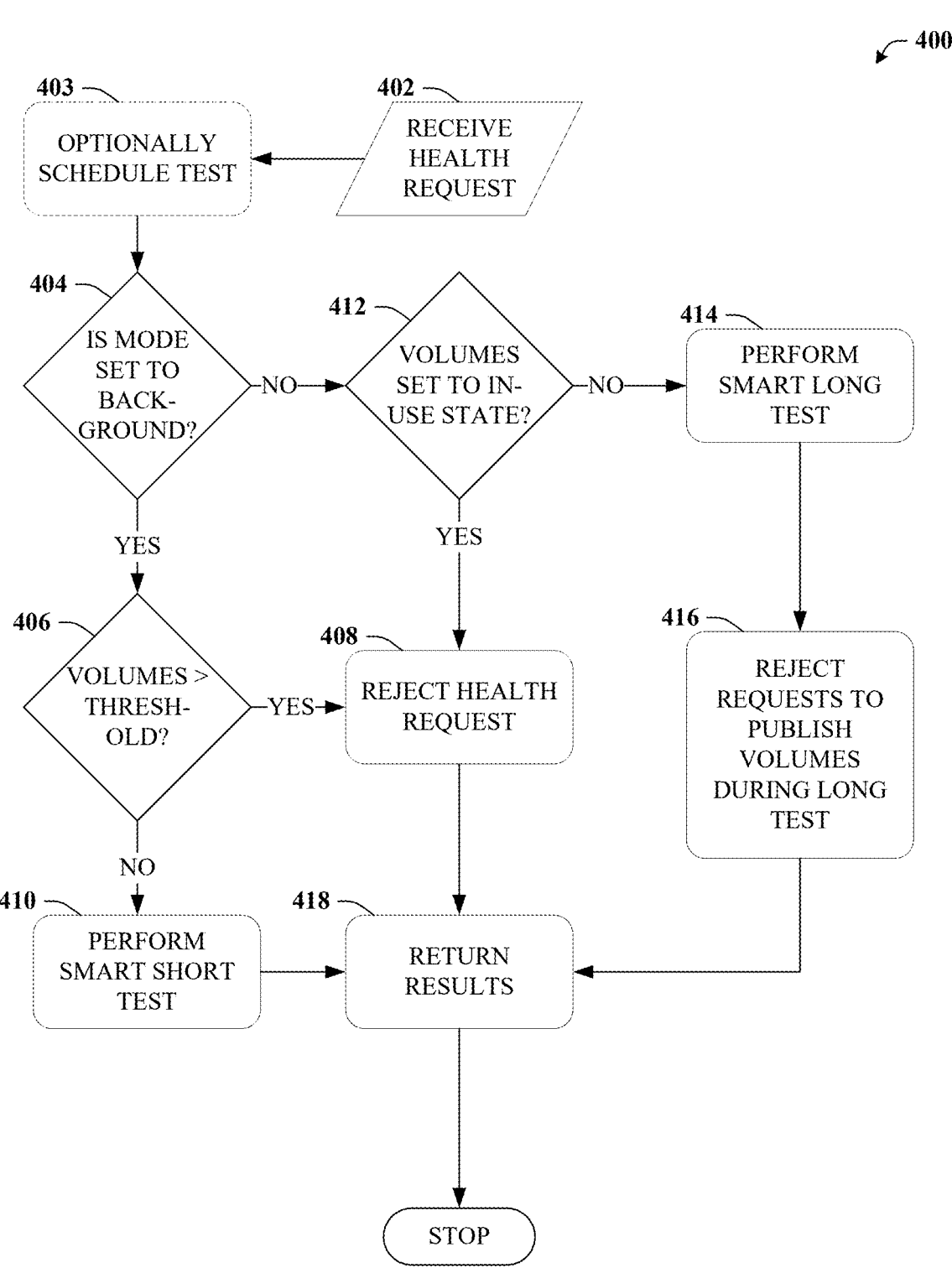
FIG. 4 depicts a schematic block diagram is depicted illustrating an example a process flow relating to a CO system initiating a volume health test for a storage system in accordance with certain embodiments of this disclosure.

While still referring to FIG. 3, but turning now as well to FIG. 4, a schematic block diagram is depicted illustrating an example process flow 400 relating to a CO system initiating a volume health test for a storage system in accordance with certain embodiments of this disclosure. Process flow 400 can be implemented by elements of a control plane (e.g., control plane 302) of a container orchestration system such as CO system 300. Thus, all or portions of process flow 400 can be executed using CSI driver 306 and/or API server 304.

Figure 5A:
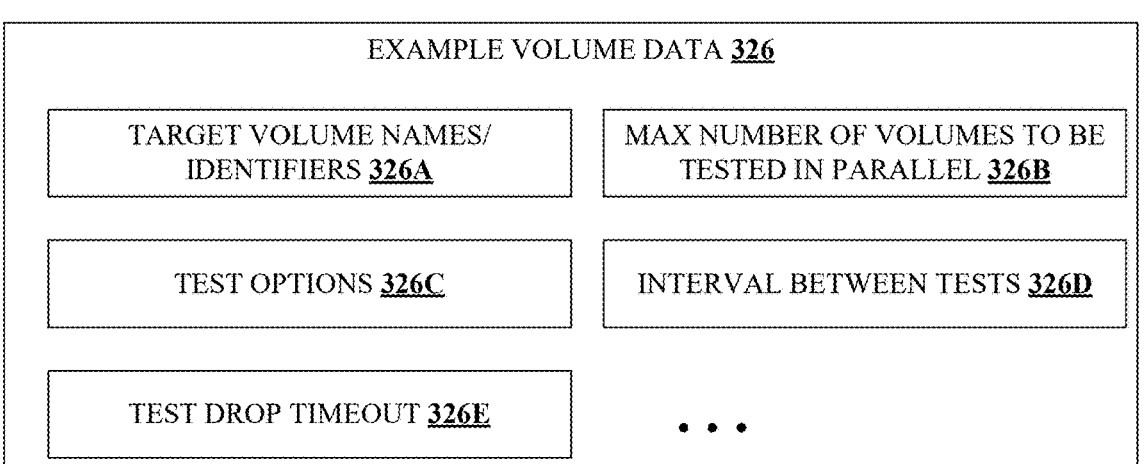
FIG. 5A depicts a schematic block diagram illustrating various examples of volume data in accordance with certain embodiments of this disclosure.

At data block 402, a health request can be received such as health request 324. As explained previously, the health request can comprise volume data (e.g., volume data 326) and mode data (e.g., mode data 328). As illustrated at FIG. 5A, volume data 326 can comprise target volume names/ID 326 (e.g., a listing of the volumes 122 to be tested), a maximum number 326B of volumes to be tested in parallel, certain test options 326C (e.g., option input to the backend test procedure, whether test is to be scheduled, . . . ), an interval 326D between tests, a test drop timeout 326E, and so on. As detailed above, mode data 328 can relate to an indication of an expected impact on other IO of storage system 120 that the health test is permitted to have, such as, e.g., example indications of background mode 328A or foreground mode 328B.

Optionally, at process block 403, the health test can be scheduled by a scheduler component of control plane 302 (e.g., see scheduler 105). In some embodiments, test options 326C included in health request 324 can be used to determine whether to use a scheduler to schedule the test or to run immediately and/or once.

At decision block 404, a check is performed: is the operating mode (e.g., mode data 328) set to background operating mode 328A. If so, the process flow 400 can proceed to decision block 406. If not, the mode is therefore set to foreground mode 328B and process flow 400 can proceed to decision block 412. At decision block 406, a check is performed: are the target volumes indicated to be tested greater than a defined threshold. If so, then process flow 400 can proceed to process block 408 where the health request is rejected.

In other words, the health request can be rejected (e.g., by CSI driver 306) prior to forwarding any health test instructions to storage system 120 under the conditions that mode data 328 indicates background operating mode 328A and the number of volumes to be tested is greater than a defined threshold. In that case, although background mode 328A is intended to provide lower impact on the target volumes, if too many volumes are targeted for testing, then the overall impact to storage system 120 can be too great and/or beyond a tolerance level. Otherwise, at process block 410 instructions can be provided to storage system 120 to perform SMART short test 340A and at process block 418, results returned.

In the case where the mode is not set to background operating mode 328A, at decision block 412, a check is performed: are the target volumes set to in-use state. If so, then process flow 400 can proceed to process block 408 where the health request is rejected. In other words, if mode data 328 indicates foreground operating mode 328B (e.g., unrestricted impact for testing) and the target volumes are in the in-use state 222, then the health request can be rejected (e.g., by CSI driver 306) prior to forwarding any health test instructions to storage system 120.

On the other hand, if the target volumes are not set to in-use state 222, but rather are determined to be in idle state 220, then process flow can proceed to process block 414 where SMART long test 340B can be performed. At process block 416, any requests to publish a target volume 122 during long test 340B can be rejected. Thus, because enforcement exists to prevent long test 340B from being initiated on a published (e.g., in-use state 222) volume, said enforcement can be extended for the duration of the long test 340B. Thereafter, at process block 418, results can be returned and process flow 400 can stop.

It can be readily appreciated that process flow 400 can operate to enforce certain aspects relating to health tests. For example, only short tests 340A can be performed when the target volumes 122 are determined to be in the in-use state 222, and then only when the number of target volumes 122 to be tested is below a defined threshold. Long tests 340B can only be performed when the target volumes are in the idle state 220.

Moreover, it is to be understood that the state of certain target volumes 122 can be affected by other volumes 122. For example, in cases where there are multiple volumes 122 on a single storage device (e.g., physical drive 124B of FIG. 1) any of the multiple volumes 122 being in the in-use state 222 (even if not among the target volumes 122) can cause a request for long test 340B to be rejected. For example, consider that volume 122A is under test, while volumes 122B and 122C are not. Suppose that volume 122A is in idle state 220, but one or both of volume 122B and 122C are in an in-use state 222. As a result, long test 340B can be rejected in connection with volume 122A due to the state of other volumes on the same physical drive 124B.

Hence, process flow 400 illustrates that at reference numeral 332 of FIG. 3, provided certain conditions relating to mode data 328 and volume status (e.g., idle state 220, in-use state 222, . . . ) are met, the associated health test relating to health request 324 can be executed at storage system. As noted, said health test can be SMART procedure 340 or another suitable test procedure 342. Thereafter, at reference numeral 334, the particular results can be provided to CSI driver 306. CSI driver 306 can receive and process those results and generate response 337 that can be suitably formatted to comply with one or more API and/or RPC specifications.

Figure 5B:
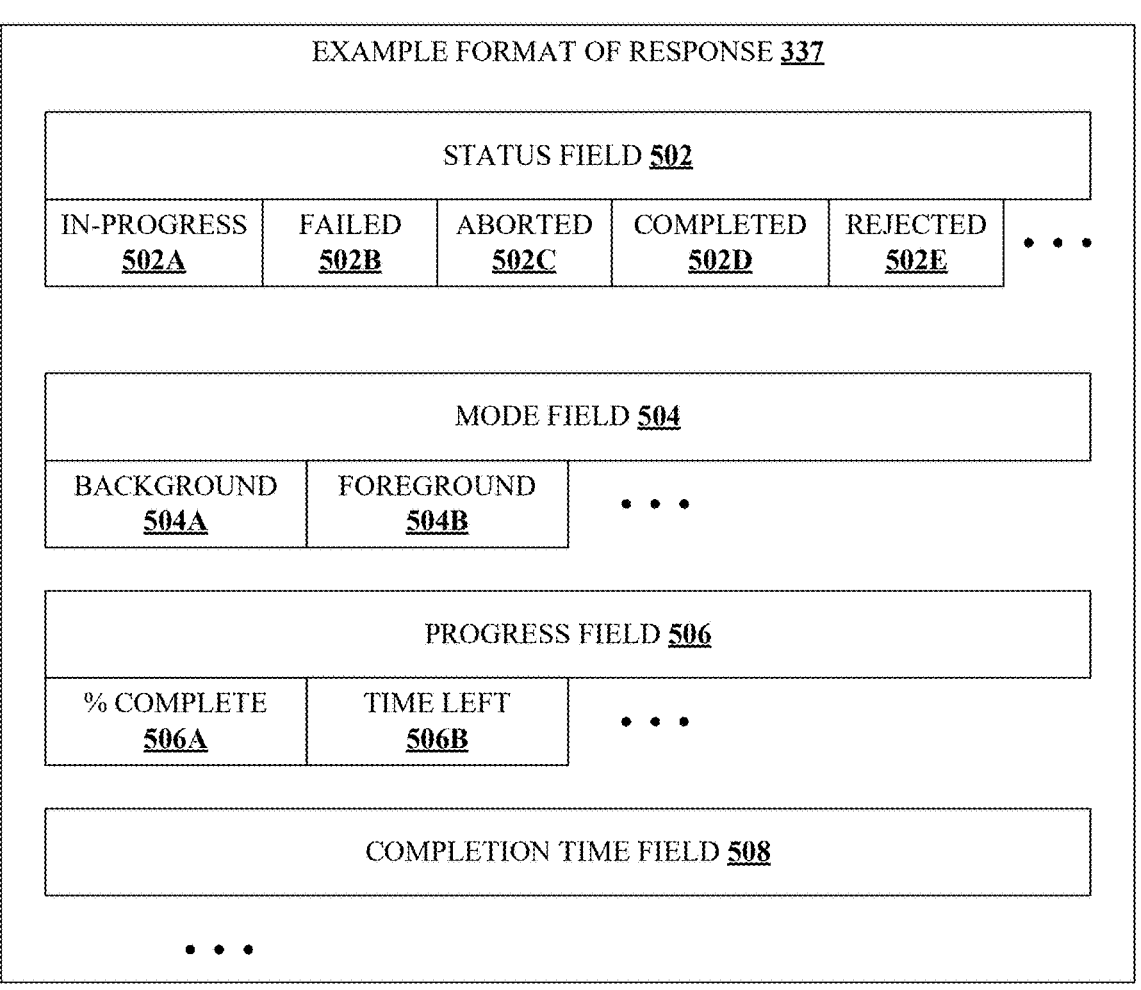
FIG. 5B depicts a schematic block diagram illustrating an example format of response 337 in accordance with certain embodiments of this disclosure.

As indicated at reference numeral 334, response can be provided to other control plane 302 elements such as API server 304. In cases where response 337 includes potential issues, associated nodes 308 or containers 310 can be notified, as indicated by reference numeral 338. FIG. 5B provides a representative example of, and further detail relating to, response 337.

Now referencing FIG. 5B, depicted is a schematic block diagram illustrating an example format of response 337 in accordance with certain embodiments of this disclosure. It is appreciated that different types of responses 337 can exist, due, e.g., to calls to different APIs or RPCs. However, it is understood that any response can have all or a portion of the different fields described herein or other suitable fields.

For example, response 337 can have status field 502 that can be populated by an associated indicator that indicates the current status of an associated health test. As representative examples, status field 502 can indicate that the associated health test is in-progress 502A, has failed 502B (e.g., due to some issue), has been aborted 502C (e.g., due to a user instruction), has been completed 502D, or has been rejected 502E (e.g., due to condition enforcement as detailed in connection with process flow 400). Other examples of status field 502 can exist in different embodiments or implementations.

Response 337 can further comprise mode field 504 that indicates requested operating mode indicated by mode data 328 of health request 324. As previously detailed, representative examples can be background mode 504A, foreground mode 504B, or substantially any indicator relating to the expected impact of the health test on the resource utilization or performance on the storage system 120.

Furthermore, response 337 can comprise progress field 506, completion time field 508, or other suitable fields. Progress field 506 can relate to an indicator that indicates a completion percentage 506A or an amount of the health test that has been completed. As another example, progress field 506 can relate to an indicator that relates to an estimated amount of time left 506B until the health test is completed. Completion time field 508 can represent an indicator (e.g., timestamp or the like) that indicates the time at which the health test was completed or otherwise the time at which one of the status field 502 indicators (e.g., 502B-502E) was applied.

As noted, the actual format for a given response can be tied to the associated RPC/API call. For example, as introduced above, a VolumeHealthTest plugin can be exposed to provide support for health request 324. As one example, health request 324 can invoke a ControllerVolumeHealth-Test RPC to trigger an associated health test. The RPC can include volume data 326, mode data 328, or other suitable data. In that case response 337 can comprise status field 502, mode field 504, progress field 506, and completion time field 508.

Since multiple volumes 122 might be sharing a single storage device such as a single physical drive 124B or group of drives, triggering health tests for a particular volume 122A might affect other volumes as well (e.g., volumes 122B and 122C). Thus, CSI driver 306 can provide API functionality to inform which volumes 122 are currently under test. For example, a ControllerListVolumesUnderTest RPC can be implemented. An associated response 337 can comprise, e.g., mode field 504, progress field 506, and completion time field 508.

Moreover, a user (e.g., user 320) can be provided the ability to abort health tests that are currently executing, e.g., via a ControllerVolumeHealthTestAbort RPC. As one example, this RPC can be utilized when impact on storage system 120 performance is causing timeouts in data access or other issues. An associated response 337 can include the aborted 502C indicator for status field 502, mode field 504, progress field 506, and completion time field 508.

In the case of aborted health tests, it can be beneficial to allow the user to restart the associated health test. Such can be accomplished via a ControllerVolumeHealthTestRestart RPC. Once this RPC is made, an associated response 337 can include status field 502, mode field 504, progress field 506, and completion time field 508.

While in some instances health request 324 can be intended as an immediate or one-time health test, such might also be scheduled, potentially in connection with certain control plane 302 elements such as, e.g., scheduler 105. To do so, volume data 326 of health request 324 can comprise all or a portion of the elements (e.g., 326A-326E) indicated at FIG. 5A. For instance, after receiving a task from user 320, scheduler 105 can build a queue of tested volumes 122 and send information to the controller. The controller can be provided by CSI specification and used as a sidecar. Hence, the controller can start the health test and process test execution via performing RPC requests to the CSI vendor portions. The controller can then inform the user about the execution status or other results.

Once the associated health test is completed, CSI driver 306 can update the latest health status, for example, by exposing the results to a user through any suitable (e.g., proprietary or vendor-specific) volume health monitoring APIs in accordance with CSI specifications.

Figure 6:
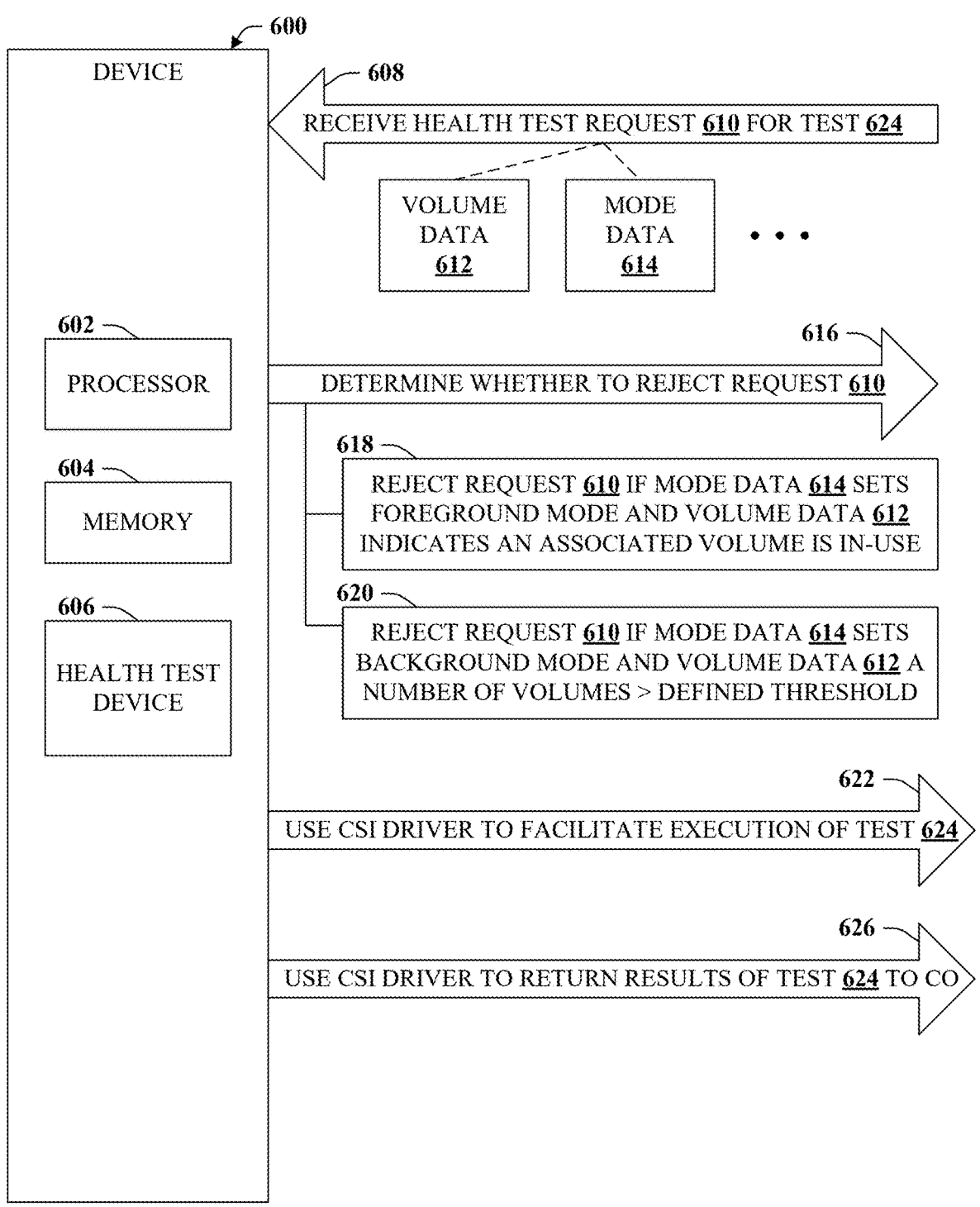
FIG. 6 depicts a schematic block diagram illustrating an example device that can leverage a CSI driver to initiate volume health tests for a storage system and enforce rules for the volume health test to be performed in accordance with certain embodiments of this disclosure

With reference now to FIG. 6, a schematic block diagram illustrating an example device 600 that can leverage a CSI driver to initiate volume health tests for a storage system and enforce rules for the volume health test to be performed in accordance with certain embodiments of this disclosure. In that regard, device 600 can, in some embodiments, be integrated into an orchestration system such as CO system 300, which can be, e.g., a Kubernetes system or another suitable container orchestration platform. In some embodiments, device 600 can be integrated with a control plane of the CO system such as control plane 302.

Device 600 can comprise at least one processor 602 that, potentially along with health test device 606, can be specifically configured to perform functions associated with initiating volume health tests via a container orchestration platform. Device 600 can also comprise at least one memory 604 that stores executable instructions that, when executed by the at least one processor 602, can facilitate performance of operations. Processor(s) 602 can be a hardware processor having structural elements known to exist in connection with processing units or circuits, with various operations of processor 602 being represented by functional elements shown in the drawings herein that can require special-purpose instructions, for example, stored in memory 604 and/or health test device 606. Along with these special-purpose instructions, processor 602 and/or health test device 606 can be a special-purpose device. Further examples of the memory 604 and processor 602 can be found with reference to FIG. 11. It is to be appreciated that device 600 or computer 1102 can represent a server device or a client device of a container orchestration services platform and computer 1102 can be used in connection with implementing one or more of the systems, devices, or components shown and described in connection with FIG. 6 and other figures disclosed herein.

As illustrated at reference numeral 608, device 600 can receive health test request 610 (e.g., health request 324). For example, health test 610 can be received via a control plane (e.g., control plane 302) of a container orchestration platform or system (e.g., CO system 300). Health test request 610 can requests a health test 624 of a storage system (e.g., storage system 120) that is exposed to the CO system via a container storage interface driver (e.g., CSI driver 306). Health test request 610 can comprise volume data 612 (e.g., volume data 326) that identifies a portion or portions of the storage system to be tested. Further, health test request 610 can comprise mode data 614 (e.g., mode data 328) that identifies an operating mode of the health test.

At reference numeral 616, device 600 can determine whether to reject health test request 610, e.g., prior to invoking any testing on backend storage devices. For example, at reference numeral 618, device 600 can reject health test request 610 in response to mode data 614 indicating a foreground mode (e.g., foreground operating mode 328B) and volume data 612 indicating an associated volume is in-use (e.g., in a published state 212 and/or the in-use state 222). Foreground mode can represent an indication that the associated health test 624 can proceed with substantially unrestricted impact on the resource utilization of the storage system. Thus, health test request 610 can be rejected in response to a target volume or another associated volume being already under test or on a same storage device as a volume under test or in the published state 212.

As another example, at reference numeral 620, device 600 can reject health test request 610 in response to mode data 614 indicating a background mode (e.g., background mode 328A) and volume data 612 indicating that a number of volumes to be tested is greater than a defined threshold. Background mode can represent an indication that the associated health test 624 is to be executed with limited impact on resource utilization of the storage system.

At reference numeral 622, device 600 can use a CSI driver (e.g., CSI driver 306) that conforms to a CSI standard or specification in order to facilitate execution of the test 624. Following execution of test 624 (e.g., a SMART test) on the backend storage system, associated results can be returned to the CSI driver. Hence, at reference numeral 626, device 600 can use the CSI driver to return formatted results of test 624 to the CO system.

Figure 7:
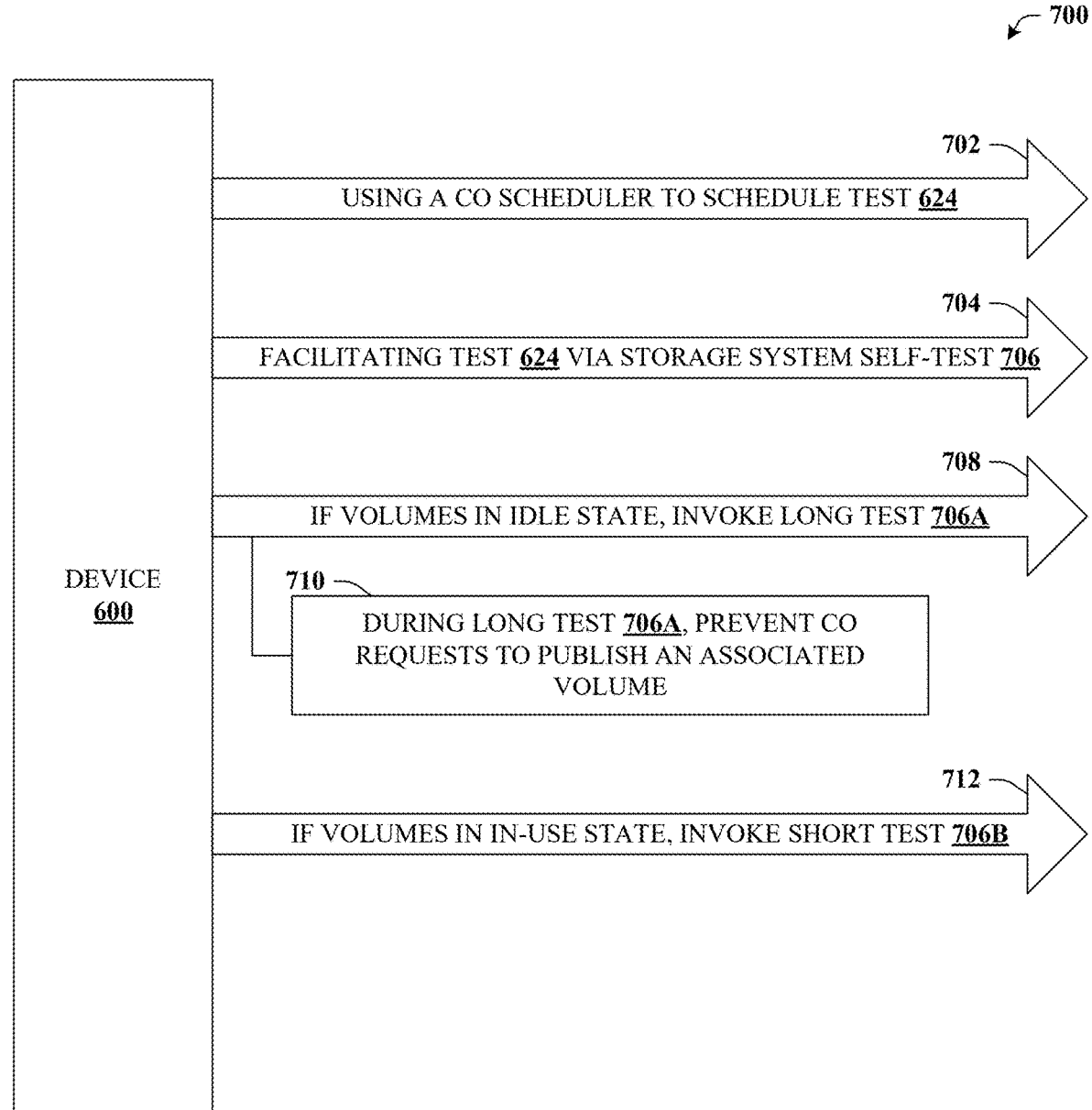
FIG. 7 depicts a schematic block diagram illustrating additional elements or aspects of the example device that can leverage a CSI driver to initiate volume health tests for a storage system and enforce rules for the volume health test to be performed in accordance with certain embodiments of this disclosure.

Turning now to FIG. 7, a schematic block diagram 700 illustrating additional elements or aspects of the example device 600 that can leverage a CSI driver to initiate volume health tests for a storage system and enforce rules for the volume health test to be performed in accordance with certain embodiments of this disclosure.

For example, at reference numeral 702, device 600 can schedule test 624 using a CO scheduler (e.g., scheduler 105). At reference numeral 704, device 600 can facilitate test 624 via a storage system self-test 706 such as, e.g., a SMART procedure 340 or another suitable procedure 342.

In that regard, in some embodiments, device 600 can determine whether target volumes qualify as being in an idle state (e.g., idle state 220). Such can mean that the target volume(s) are in the idle state as well as other volumes of the same physical storage device(s). If the target volumes do qualify as being in the idle state, then device 600 can invoke long test 706A (e.g., SMART long test 340B). During long test 706A, device 600 can prevent CO requests to publish an associated volume. Such can mean that requests can rejected when requesting to publish a volume under test or a volume that is on the same storage device(s) as the volume under test.

On the other hand if the target volumes do not qualify as being in the idle state, but rather are determined to be in an in-use state (e.g., in-use state 222) as indicated at reference numeral 712, then device 600 can invoke short test 706B (e.g., SMART short test 340A).

Example Methods

Figure 8:
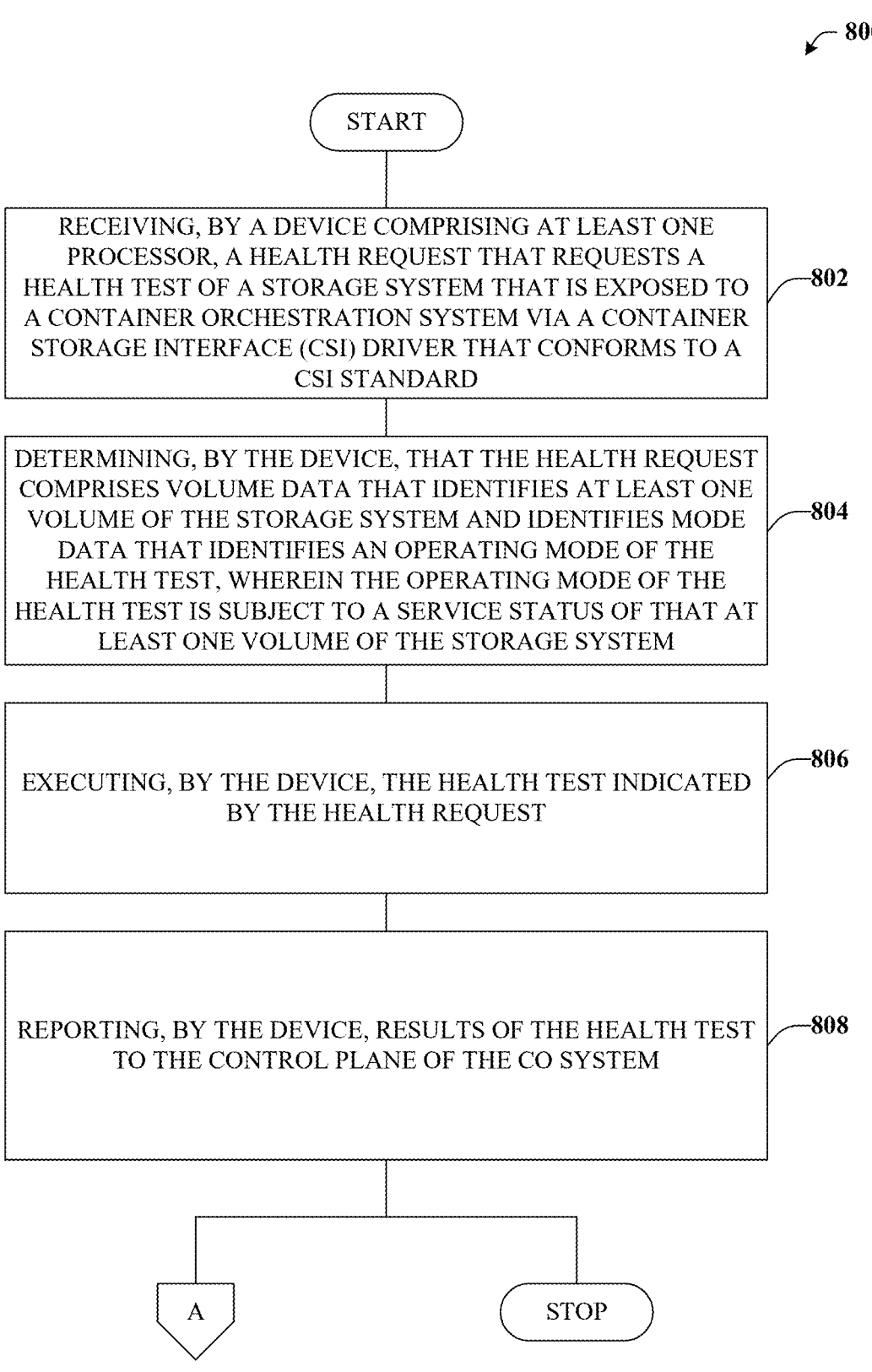
FIG. 8 illustrates an example method that can leverage a CSI driver to initiate volume health testing for a storage system exposed to a CO system in accordance with certain embodiments of this disclosure.
Figure 9:
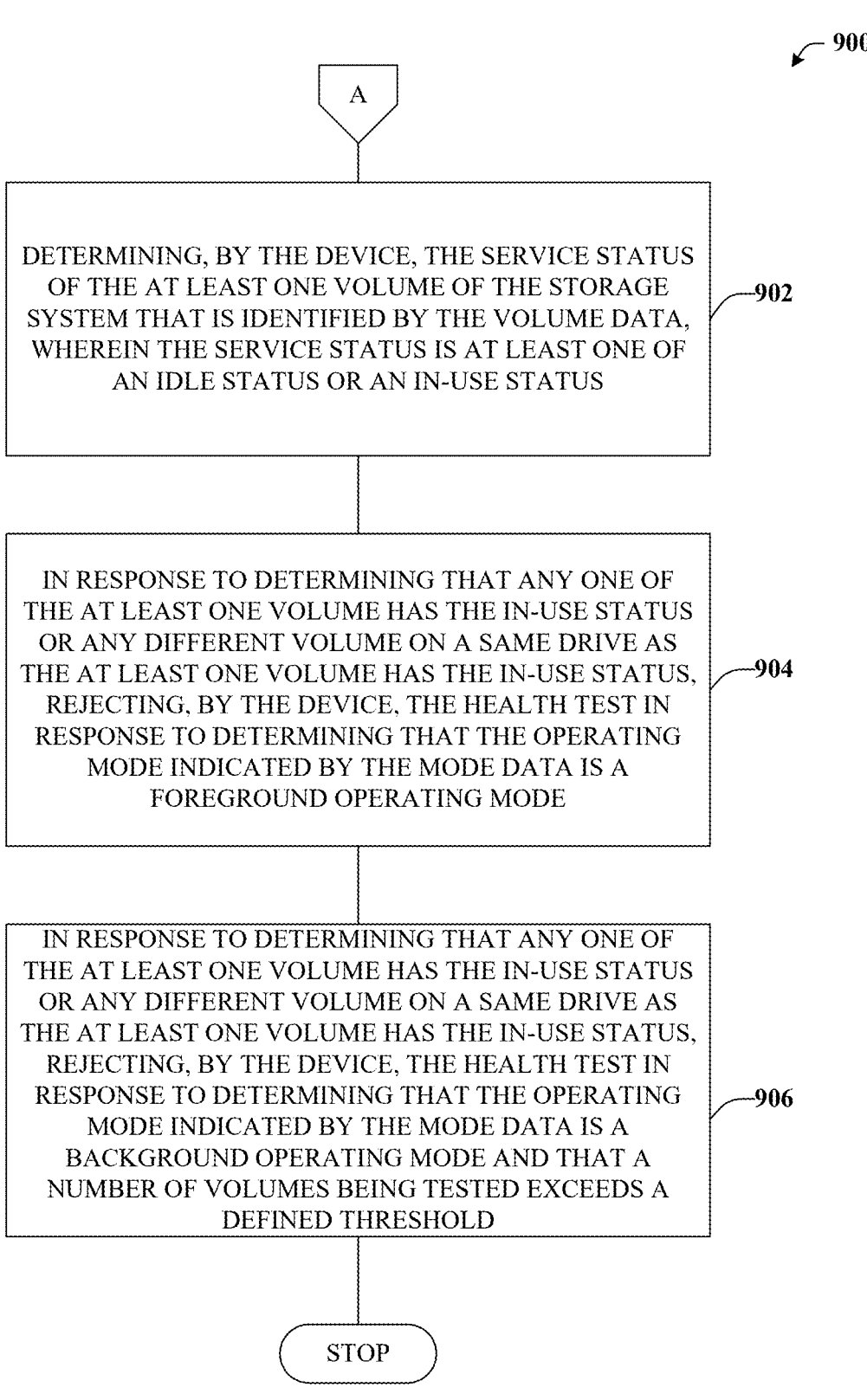
FIG. 9 illustrates an example method that can provide additional aspects or elements relating to leveraging a CSI driver to initiate volume health testing for a storage system exposed to a CO system in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 8, exemplary method 800 is depicted. Method 800 that can leverage a CSI driver to initiate volume health testing for a storage system exposed to a CO system in accordance with certain embodiments of this disclosure. While method 800 describes a complete method, in some embodiments, method 800 can include one or more elements of method 900, as illustrated by insert A.

At reference numeral 802, a device comprising at least one processor can receive a health request that requests a health test of a storage system that is exposed to a container orchestration system via a container storage interface driver that conforms to a CSI standard. In some embodiments, the health request can be transmitted by a user entity and can be received by a control plane of the CO system, for example, via an API server.

At reference numeral 804, the device can determine that the health request comprises volume data that identifies at least one volume of the storage system. The health request can further comprise mode data that identifies an operating mode of the health test. The operating mode of the health test can be subject to a service status of the at least one volume of the storage system.

At reference numeral 806, the device can execute the health test indicated by the health request. At reference numeral 808, the device can report results of the health test to the control plane of the CO system. Method 800 can terminate or continue to insert A, which is further detailed in connection with FIG. 9.

Turning now to FIG. 9, exemplary method 900 is depicted. Method 900 can provide additional aspects or elements relating to leveraging a CSI driver to initiate volume health testing for a storage system exposed to a CO system in accordance with certain embodiments of this disclosure.

At reference numeral 902, the device introduced at reference numeral 802 comprising at least one processor can determine the service status of the at least one volume of the storage system that is identified by the volume data. For example the service state can be a created state, a node_ready state, a vol_ready state, or a published state, as detailed in connection with FIG. 2. As detailed, such states can be categorized or grouped in terms of an idle state versus an in-use state. Hence, the service status can be one of the idle status or the in-use status.

At reference numeral 904, the device can determine whether any one of the at least one volume has the in-use status or any different volume on a same drive as the at least one volume has the in-use status. In response to such a determination and further in response to a determination that the operating mode indicated by the mode data is a foreground operating mode, device 600 can reject the health test.

At reference numeral 906, the device can determine that any one of the at least one volume has the in-use status or any different volume on a same drive as the at least one volume has the in-use status. In response to such a determination and further in response to a determination that the operating mode indicated by the mode data is a background operating mode and that a number of volumes being tested exceeds a defined threshold, device 600 can reject the health test.

Example Operating Environments

Figure 10:
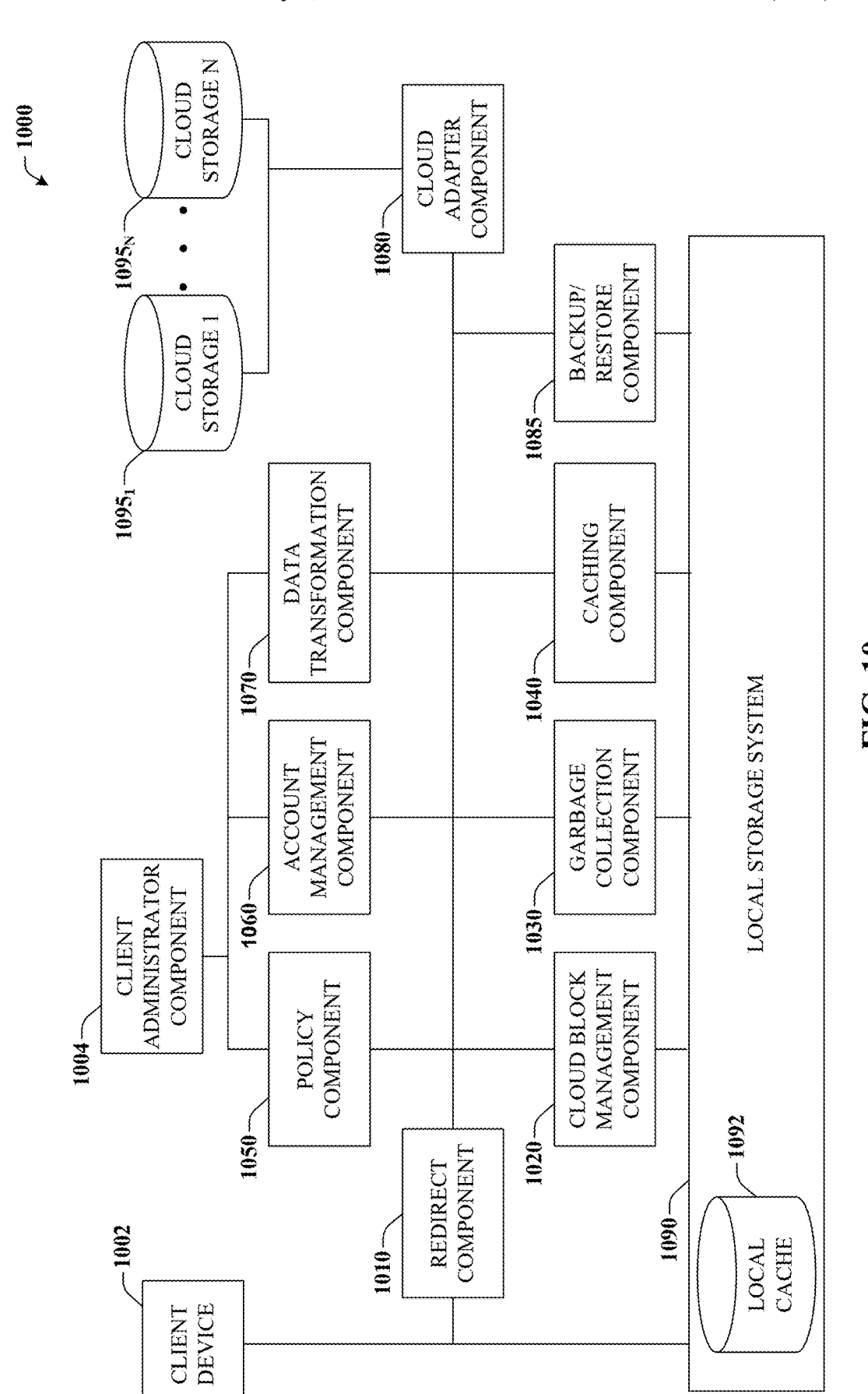
FIG. 10 illustrates a block diagram of an example distributed file storage system that employs tiered cloud storage in accordance with certain embodiments of this disclosure.
Figure 11:
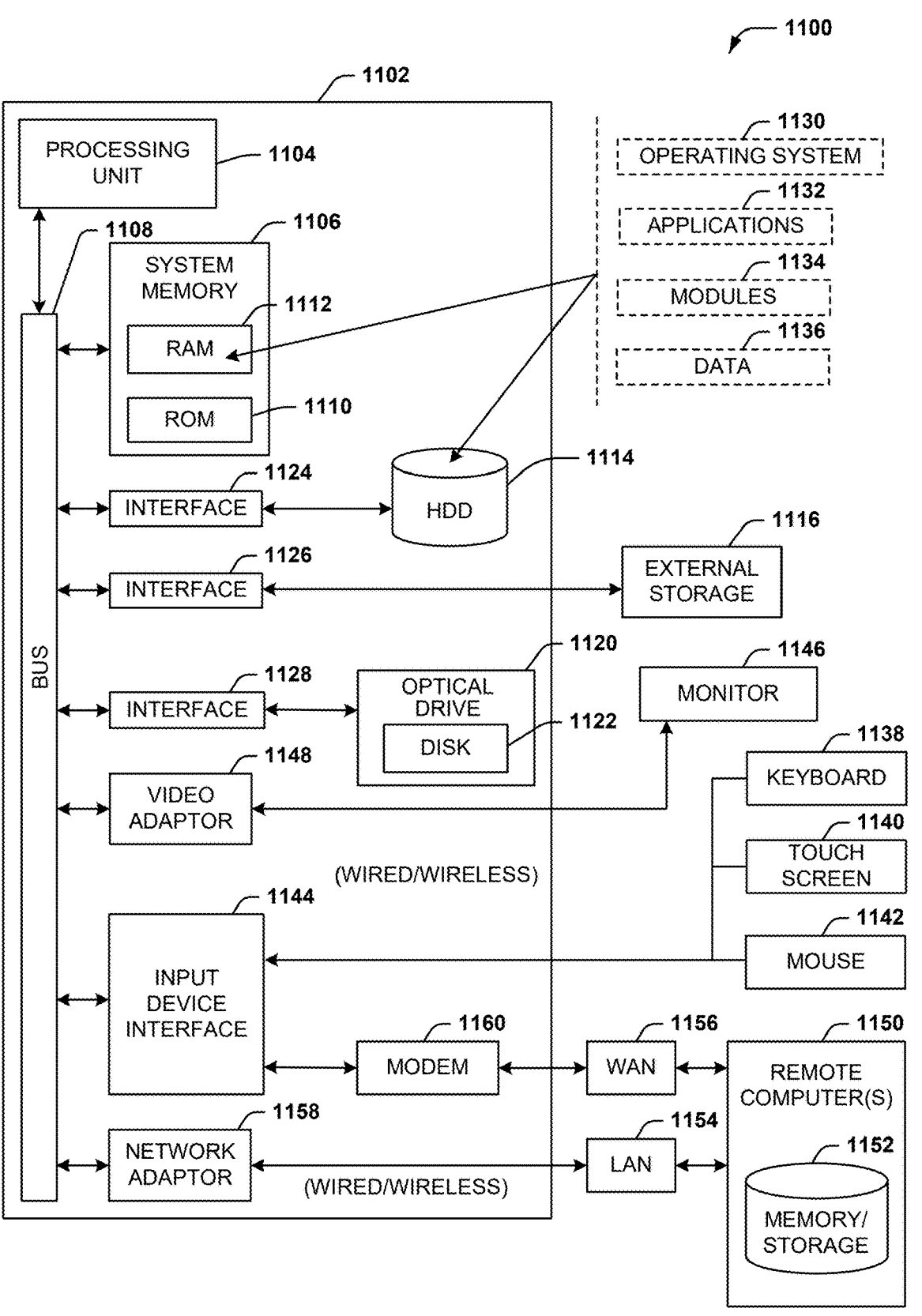
FIG. 11 illustrates an example block diagram of a computer operable to execute certain embodiments of this disclosure.

To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with aspects described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 1095₁ and cloud storage N 1095ₙ, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A device, comprising:
at least one processor; and
at least one memory that stores executable instructions that, when executed by the at least one processor, facilitate performance of operations, comprising:
receiving, via a control plane of a container orchestration (CO) system, a health request that requests a health test of a storage system that is exposed to the CO system via a container storage interface (CSI) driver that conforms to a specified CSI standard, wherein the health request comprises:
volume data that identifies a portion of the storage system to be tested; and mode data that identifies an operating mode of the health test;
executing, using the CSI driver, the health test indicated by the health request; and
returning, using the CSI driver, results of the health test to the control plane of the CO system,
wherein the results of the health test represent testing results from a self-monitoring, analysis, and reporting technology (SMART) procedure implemented by storage devices of the storage system, and
wherein the SMART procedure is implemented as a SMART short test in response to the mode data indicating a background operating mode, and a SMART long test in response to the mode data indicating a foreground operating mode.

2. The device of claim 1, wherein the mode data comprises an indication of at least one of:
the background operating mode indicating that the health test is to operate as a background operation having a limited impact on resource utilization of the storage system relative to an unrestricted impact on the resource utilization of the storage system; or
the foreground operating mode indicating that the health test is to operate as a foreground operation with the unrestricted impact on the resource utilization of the storage system.

3. The device of claim 2, wherein the operations further comprise determining a service status of a target volume of the storage system that is identified by the volume data, and wherein the health test executed using the CSI driver compares the mode data to the service status of the target volume and, in response to the mode data indicating the foreground operating mode and the service status of the target volume being determined to be an in-use state or a published state, rejecting the health request.

4. The device of claim 3, wherein the service status is at least one of: an idle state or the in-use state, wherein the idle state is determined to exist in response to the target volume being determined to be in a created state, a node-ready state, or a volume-ready state, and wherein the idle state is determined to exist in response to the target volume being determined to be in the published state.

5. The device of claim 2, wherein the operations further comprise:
determining a number of volumes identified by the volume data; and
in response to the number of volumes being greater than a defined threshold and the mode data indicating the background operating mode, rejecting the health request.

6. The device of claim 1, wherein the operations further comprise generating response data indicative of a response to the health request, the response data comprising at least one of: a status field that indicates a status of the health test, a mode field that indicates the operating mode of the health test, a progress field that indicates an execution progress of the health test, or a completion field that indicates a time associated with a completion of the health test according to a type of completion indicated by the status field.

7. The device of claim 6, wherein the status field represents an indication that the health test is in at least one of: an in-progress state, a failed state, an aborted state, a completed state, or a rejected state.

8. The device of claim 1, wherein the control plane or the CSI driver comprises an interface structure, comprising an application programming interface (API) or a remote procedure call (RPC) interface, that is configured to process the health request, and wherein the interface structure is further configured to process:

a request to identify volumes currently being tested;

a request to abort the health test;

a request to restart the health test; or a request to schedule the health test.

9. The device of claim 8, wherein the request to schedule the health test comprises the volume data identifying the portion of the storage system to be tested, a maximum number of volumes to be tested in parallel per storage class, test options data indicating configurable options for the health test, test interval data indicating intervals between testing and a timeout data indicating a threshold time in which to abort the test.

10. The device of claim 1, wherein the operations further comprise forwarding, using the CSI driver, the health test to the storage system and receiving, using the CSI driver, the results from the storage system.

11. A method, comprising:

receiving, by a device comprising at least one processor, a health request that requests a health test of a storage system that is exposed to a container orchestration (CO) system via a container storage interface (CSI) driver that conforms to a CSI standard;

determining, by the device, that the health request comprises volume data that identifies at least one volume of the storage system and comprises mode data that identifies an operating mode of the health test, wherein the operating mode of the health test is subject to a service status of that at least one volume of the storage system;

executing, by the device, the health test indicated by the health request;

reporting, by the device, results of the health test to a control plane of the CO system;

determining, by the device, the service status of the at least one volume of the storage system that is identified by the volume data, wherein the service status is at least one of an idle status or an in-use status; and in response to determining that any one of the at least one volume has the in-use status or any different volume on a same drive as the at least one volume has the in-use status rejecting, by the device, the health test in response to determining that the operating mode indicated by the mode data is a foreground operating mode, or rejecting, by the device, the health test in response to determining that the operating mode indicated by the mode data is a background operating mode and that a number of volumes being tested exceeds a defined threshold.

12. A non-transitory computer-readable medium comprising instructions that, in response to execution, cause a system comprising at least one processor to perform operations, comprising:

receiving, via a control plane of a container orchestration (CO) system, a health request that requests a health test of a storage system that is exposed to the CO system via a container storage interface (CSI) driver that conforms to a CSI standard, wherein the health request comprises:

volume data that identifies a portion of the storage system to be tested; and mode data that identifies an operating mode of the health test;

executing, by the CSI driver, the health test indicated by the health request; and returning, by the CSI driver, results of the health test to the control plane of the CO system, wherein the results of the health test represent testing results from a self-monitoring, analysis, and reporting technology (SMART) procedure implemented by storage devices of the storage system, and wherein the SMART procedure is implemented as a SMART short test in response to the mode data indicating a background operating mode, and a SMART long test in response to the mode data indicating a foreground operating mode.

13. The non-transitory computer-readable medium of claim 12, wherein the operations further comprise forwarding, by the CSI driver, the health test to the storage system and receiving, by the CSI driver, the results from the storage system.

14. The non-transitory computer-readable medium of claim 12, wherein the mode data comprises an indication of at least one of:

the background operating mode indicating that the health test is to operate as a background operation having a limited impact on resource utilization of the storage system relative to an unrestricted impact on the resource utilization of the storage system; or the foreground operating mode indicating that the health test is to operate as a foreground operation with the unrestricted impact on the resource utilization of the storage system.

15. The non-transitory computer-readable medium of claim 14, wherein the operations further comprise determining a service status of a target volume of the storage system that is identified by the volume data, and wherein the health test executed using the CSI driver compares the mode data to the service status of the target volume and, in response to the mode data indicating the foreground operating mode and the service status of the target volume being determined to be an in-use state or a published state, rejecting the health request.

16. The non-transitory computer-readable medium of claim 15, wherein the service status is at least one of: an idle state or the in-use state, wherein the idle state is determined to exist in response to the target volume being determined to be in a created state, a node-ready state, or a volume-ready state, and wherein the idle state is determined to exist in response to the target volume being determined to be in the published state.

17. The non-transitory computer-readable medium of claim 14, wherein the operations further comprise:

determining a number of volumes identified by the volume data; and in response to the number of volumes being greater than a defined threshold and the mode data indicating the background operating mode, rejecting the health request.

18. The non-transitory computer-readable medium of claim 12, wherein the operations further comprise generating response data indicative of a response to the health request, the response data comprising at least one of: a status field that indicates a status of the health test, a mode field that indicates the operating mode of the health test, a progress field that indicates an execution progress of the health test, or a completion field that indicates a time associated with a completion of the health test according to a type of completion indicated by the status field.

19. The non-transitory computer-readable medium of claim 18, wherein the status field represents an indication that the health test is in at least one of: an in-progress state, a failed state, an aborted state, a completed state, or a rejected state.

20. The non-transitory computer-readable medium of claim 12, wherein the control plane or the CSI driver comprises an interface structure, comprising an application programming interface (API) or a remote procedure call (RPC) interface, that is configured to process the health request, and wherein the interface structure is further configured to process:

a request to identify volumes currently being tested;

a request to abort the health test;

a request to restart the health test; or a request to schedule the health test.

\* \* \* \* \*